United States Patent
Tan et al.

(10) Patent No.: US 11,947,995 B2
(45) Date of Patent: Apr. 2, 2024

(54) END-TO-END DATA PROTECTION FOR FAR MEMORY DATA TRANSFER FROM HOST TO MEDIA

(71) Applicant: Intel Corporation, Santa Clara, CA (US)

(72) Inventors: Kuan Hua Tan, Coquitlam (CA); Sahar Khalili, Vancouver (CA); Eng Hun Ooi, Georgetown (MY); Shrinivas Venkatraman, Folsom, CA (US); Dimpesh Patel, Surrey (CA)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 16/878,064

(22) Filed: May 19, 2020

(65) Prior Publication Data

US 2020/0278883 A1  Sep. 3, 2020

(51) Int. Cl.
| | |
|---|---|
| *G06F 9/54* | (2006.01) |
| *G06F 9/46* | (2006.01) |
| *G06F 11/30* | (2006.01) |
| *G06F 13/16* | (2006.01) |
| *G06F 13/38* | (2006.01) |
| *G06F 13/42* | (2006.01) |

(52) U.S. Cl.
CPC ............ *G06F 9/467* (2013.01); *G06F 9/546* (2013.01); *G06F 11/3037* (2013.01); *G06F 13/1668* (2013.01); *G06F 13/385* (2013.01); *G06F 13/4221* (2013.01); *G06F 2213/0026* (2013.01); *G06F 2213/3808* (2013.01)

(58) Field of Classification Search
CPC ...... G06F 9/467; G06F 9/546; G06F 13/1668; G06F 13/385; G06F 13/4221; G06F 11/3037; G06F 2113/0026; G06F 2113/3808

USPC ......................................................... 711/147
See application file for complete search history.

(56) References Cited

U.S. PATENT DOCUMENTS

| | | | |
|---|---|---|---|
| 8,713,357 | B1 | 4/2014 | Jean et al. |
| 9,734,116 | B2 | 8/2017 | Spry et al. |
| 10,976,956 | B2 * | 4/2021 | Lu .................... G06F 12/0873 |

(Continued)

FOREIGN PATENT DOCUMENTS

EP       3514690 A1     7/2019

OTHER PUBLICATIONS

Extended European Search Report for Patent Application No. 20216302.8, dated Jun. 14, 2021, 13 pages.

(Continued)

*Primary Examiner* — Christopher B Shin
(74) *Attorney, Agent, or Firm* — Compass IP Law PC

(57) ABSTRACT

A multilevel memory system includes a nonvolatile memory (NVM) device with an NVM media having a media write unit that is different in size than a host write unit of a host controller of the system that has the multilevel memory system. The memory device includes a media controller that controls writes to the NVM media. The host controller sends a write transaction to the media controller. The write transaction can include the write data in host write units, while the media controller will commit data in media write units to the NVM media. The media controller can send a transaction message to indicate whether the write data for the write transaction was successfully committed to the NVM media.

21 Claims, 6 Drawing Sheets

(56) References Cited

U.S. PATENT DOCUMENTS

| | | | |
|---|---|---|---|
| 2006/0020752 A1* | 1/2006 | Schnapp | G06F 12/0804 |
| | | | 711/143 |
| 2015/0178202 A1* | 6/2015 | Sankaran | G06F 12/0804 |
| | | | 711/143 |
| 2017/0123721 A1* | 5/2017 | Sela | G06F 3/0611 |
| 2018/0364940 A1* | 12/2018 | Motwani | G06F 3/0647 |
| 2019/0073142 A1* | 3/2019 | Ash | G06F 3/0619 |
| 2019/0129656 A1 | 5/2019 | Bains et al. | |
| 2019/0227737 A1* | 7/2019 | Gilsdorf | G06F 3/0604 |
| 2019/0278513 A1 | 9/2019 | Venkatraman et al. | |

OTHER PUBLICATIONS

European First Office Action, (EP Exam Report Article 94(3) EPC), for Patent Application No. 20216302.8, dated Mar. 23, 2023, 9 pages.

* cited by examiner

Message 302

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 312 → 314 → | FMT | | | TYPE | | | | | R | TCMEM PARAM | | | R | R | R | R | TD | EP | ATTR | | R | | | | LENGTH | | | | | | | |
| 322 → | REQUESTER ID | | | | | | | | | | | | | | | | ORIGINAL MWR TAG | | | | | | | | MESSAGE CODE VENDOR_DEFINED | | | | | | | |
| 324 → | BUS NUMBER | | | | | | | | DEVICE NUMBER | | | | | FUNCTION NUMBER | | | VENDOR ID | | | | | | | | | | | | | | | |
| 326 → 328 → | SECTOR WRITTEN | R | STATUS | | | R | | | R | | | | | | | | R | | | | | | | | VENDOR MESSAGE | | | | | | | |

Status Field 304

| STATUS (STS) | DESCRIPTION |
|---|---|
| 000 | SUCCESSFUL |
| 001 (UR) | UNSUPPORTED REQUEST: PERFORM ERROR HANDLING (EXAMPLE: ACCESS OUT OF ADDRESS RANGE OR TO UNSUPPORTED REGION) |
| 100 (CA) | COMPLETER ABORT: FATAL ERROR – PERFORM ERROR HANDLING |
| ALL OTHERS | RESERVED |

FIG. 3

END-TO-END DATA PROTECTION FOR FAR MEMORY DATA TRANSFER FROM HOST TO MEDIA

FIELD

Descriptions are generally related to memory subsystems, and more particular descriptions are related to data protection for data transfers in a multilevel memory system.

BACKGROUND

A computer system includes the host hardware components, such as the central processor and interconnection hardware. The host hardware components execute a host operating system that manages the computer system. The computer system can include one or more levels of memory coupled to the host, including nonvolatile memory or nonvolatile storage that maintains state even when power is interrupted to the system. The nonvolatile memory can be connected to the host processor as a peripheral device.

Traditionally, peripheral connections to memory or storage can include an acknowledgement mechanism that ensures the transfer of data across the peripheral connection. For example, a bus transfer protocol such as peripheral component interconnection express (PCIe) allows the memory device to acknowledge receipt of data packets from the host. Despite ensuring the connection is good, the host can still request more writes than the memory device is capable of performing, or there could be a problem associated with writing the data to the memory device. The host will assume that data acknowledged as being received is written correctly.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 3 is a representation of an example of a message to indicate when data is committed to memory.

Figure 1:
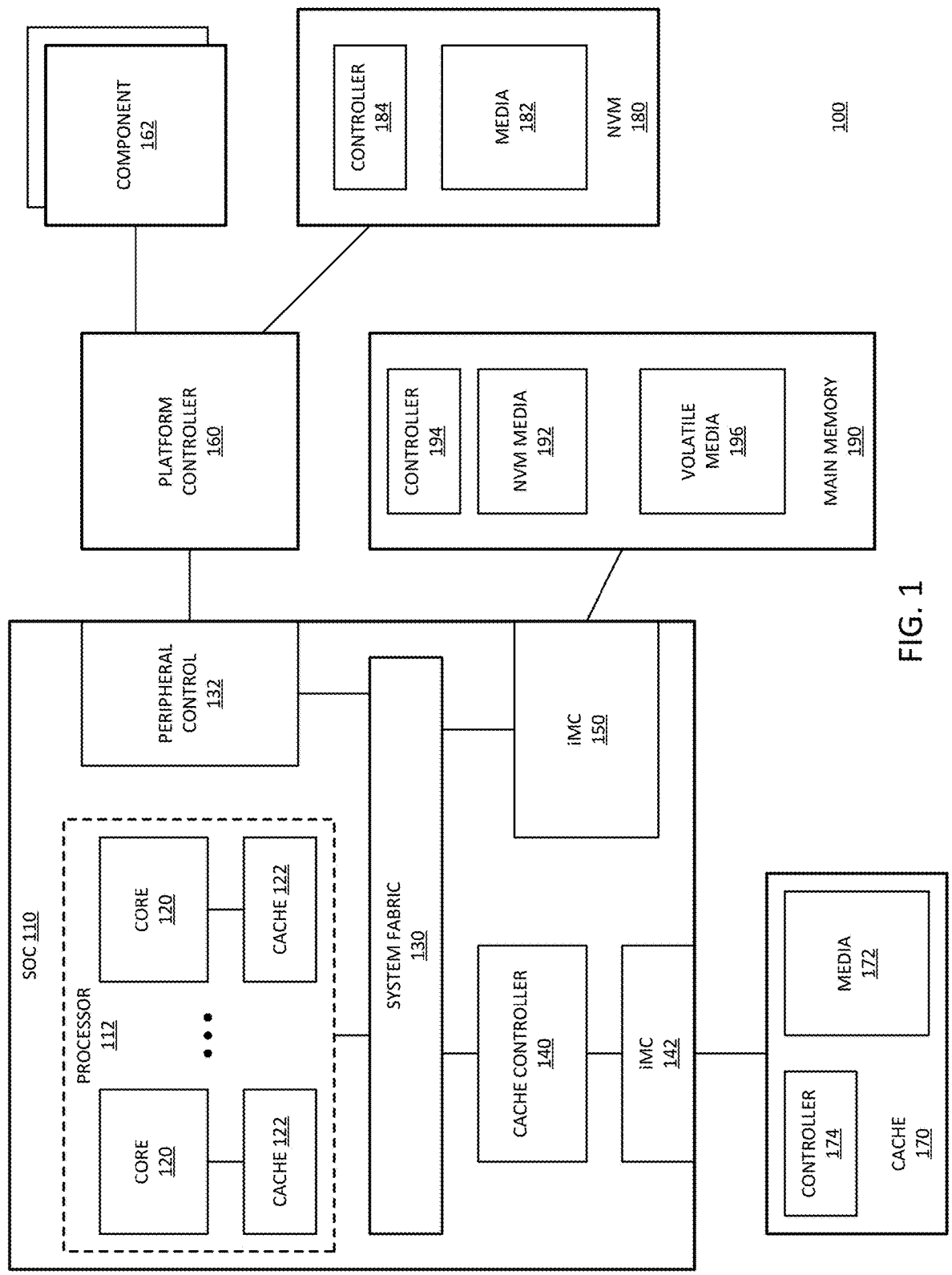
FIG. 1 is a block diagram of an example of a multilevel memory system with different write data unit granularities, where a storage media provides a message to indicate when data is committed to memory.

Descriptions of certain details and implementations follow, including non-limiting descriptions of the figures, which may depict some or all examples, and well as other potential implementations.

DETAILED DESCRIPTION

As described herein, a computer system includes a nonvolatile memory (NVM) device or storage device connected to the host over a link that provides data protection. In one example, the data protection includes flow control through the use of write credits to the NVM devices. In one example, the data protection includes error protection with a message returned to indicate whether the host data was successfully committed to the NVM device. In one example, the error message can include an indication of errors that occurred in the writing of the data.

Reference made to a nonvolatile memory (NVM) refers to a memory device having nonvolatile memory media. A nonvolatile memory media refers to a medium that stores data in a nonvolatile manner. Thus, even if power is interrupted to the device, the data remains determinate because it retains its state. A volatile memory media, by contrast, has indeterminate state if power is interrupted, and may require frequent data refresh to maintain its state. For simplicity, the description will not distinguish between "memory device" and "storage device" with respect to the use of NVM media. Reference to an NVM device can refer to a device that can receive asynchronous writes to the NVM media, in that the host controller requests the write and does not wait for an acknowledgement of the write before performing other operations, which could include additional write requests.

A host can refer to the host hardware or the host software, or a combination of the host hardware and host software. The host refers to the platform that provides the operational system for the NVM device. As the need for increased memory in computer systems increases, both volatile and nonvolatile memory, many systems employ multiple levels of memory, which can include memory of different types. Such multilevel memory (MLM) systems, which includes two-level memory (2LM) systems, can use an NVM device as a cache for working memory for the host processor or another processor (e.g., a graphics processor) on the host platform. In such implementations, the host typically needs to frequently write large amounts of data to the NVM media.

In an MLM system, the NVM media may have a media write unit that is different in size than a host write unit of the host controller. A write unit refers to a smallest atomic unit that is written in a write operation. The smallest atomic unit for a write transaction can be referred to as the smallest writeable unit for the controller. The host typically has much higher execution speed than a memory device can read or write the data. With larger memory devices, such a circumstance tends to be more pronounced. NVM devices tend to have write limits and write times that are significantly greater than the operational speed of the host processor. With the write limitations and speed limitations, NVM devices tend to benefit from writing portions of data that are larger than the unit of data wanted by the host processor for execution. Thus, the NVM media can have an atomic unit for writes or a media write unit that is a multiple of the host write unit or the unit of data that the host will send to the memory device for a write transaction.

For example, the host may have a write unit of 512 Bytes while the NVM media has a media write unit of 2 KB, or four host write units. Such data sizes are merely examples, and the host write unit could be a different size (e.g., 256 B, 128 B) and the media write unit could be a different size (e.g., 1 KB, 4 KB). While terminology can differ, in one implementation, the host write unit could be referred to as a data "chunk" or data "sector" and the media write unit could be referred to as a data "slice".

Consider an example where the host write unit is a data sector and the media write unit is a data slice, in a system where the NVM device is connected to the host over a peripheral component interconnection express (PCIe) connection. In such an example, the PCIe host often needs to write a data sector to the storage media frequently. The NVM media will tend to buffer multiple data sectors until an entire slice is ready to be written to the NVM media. Such a configuration allows the host to write data sectors when they are ready for writing without having to store the entire slice on the host and sending the entire slice, which may contain unchanged data, and therefore have significant amounts of redundant data. Additionally, the PCIe link transfer can be reduced by the use of higher priority transaction layer packets (TLP) or data link layer packets (DLLP) with smaller sectors of data. Such a configuration also enables the host to update non-contiguous sectors of data within a media slice.

Even with a configuration that enables the use of NVM media as a memory cache, high error rates in the data can reduce the effectiveness of the caching by requiring more operations for error handling. Traditional data transfer protocols used for memory systems with NVM media cannot track end-to-end data transfers from the host to the media. Transfer protocols may provide mechanisms to ensure the health of the link, but cannot provide end-to-end per-packet data protection from the host to a verified write to the media.

The NVM memory device includes a media controller that controls writes to the NVM media. The host controller sends a write transaction to the media controller. The write transaction can include the write data in host write units, while the media controller will commit data in media write units to the NVM media. In one example, the host controller maintains write credits for writes to the NVM media. In one example, both the host controller and the media controller maintain write credits. The write credits can provide an end-to-end flow control mechanism for host writes to the NVM media.

In one example, the media controller can send a transaction message to indicate whether the write data for the write transaction was successfully committed to the NVM media. Such a transaction message enables the media controller to indicate the success of the writes to the host for specific write transactions. The use of data protection can provide for data transfers from the host to the NVM media with a response provided by the NVM media controller to indicate whether data in each transfer was committed to the NVM media or not.

FIG. 1 is a block diagram of an example of a multilevel memory system with different write data unit granularities, where a storage media provides a message to indicate when data is committed to memory. System 100 specifically illustrates an integrated memory controller and integrated cache controller. The integrated controllers are integrated onto a processor die or in a processor SOC (system on a chip) package as another component with the processor die.

SOC 110 represents an example of a processor die or a processor SOC package. SOC 110 includes processor 112, which can include one or more cores 120 (i.e., a single core processor or a multicore processor) to perform the execution of instructions. In one example, cores 120 include processor side cache 122, which will include cache control circuits and cache data storage. Cache 122 can represent any type of cache on the processor side. In one example, individual cores 120 include local cache resources 122 that are not shared with other cores. In one example, multiple cores 120 share cache resources 122.

In one example, SOC 110 includes system fabric 130 to interconnect components of the processor system. System fabric 130 can be or include interconnections between processor 112, peripheral control 132, one or more memory controllers such as integrated memory controller (iMC) 150 and cache controller 140, I/O controls (not specifically shown), graphics subsystem (not specifically shown), or other component. System fabric 130 enables the exchange of data signals among the components. While system fabric 130 is generically shown connecting the components, it will be understood that system 100 does not necessarily illustrate all component interconnections. System fabric 130 can represent one or more mesh connections, a central switching mechanism, a ring connection, a hierarchy of fabrics, or other interconnection topology.

In one example, SOC 110 includes one or more peripheral controllers 132 to connect to peripheral components or devices that are external to SOC 110. In one example, peripheral control 132 represents hardware interfaces to platform controller 160, which includes one or more components or circuits to control interconnection in a hardware platform or motherboard of system 100 to interconnect peripherals to processor 112. Components 162 represent any type of chip or interface or hardware element that couples to processor 112 via platform controller 160.

In one example, SOC 110 includes iMC 150, which specifically represents control logic to connect to main memory 190. iMC 150 can include hardware circuits and software/firmware control logic. In one example, SOC 110 includes cache controller 140, which represents control logic to control access to cache memory or cache 170. Cache memory 170 represents the storage for a cache, and may be referred to herein simply as cache 170 for convenience. Cache controller 140 can include hardware circuits and software/firmware control logic. In one example, SOC 110 includes iMC 142, which specifically represents control logic to connect to cache 170. iMC 142 can include hardware circuits and software/firmware control logic, including scheduling logic to manage access to cache 170. In one example, iMC 142 is integrated into cache controller 140, which can be integrated into processor 112. In one example, cache controller 140 is similar to iMC 150, but to interface to cache 170, which acts as an auxiliary memory, instead of connecting to main memory 190. In one example, cache controller 140 is a part of or a subset of control logic of a memory controller represented by iMC 150.

In one example, system 100 includes NVM 180 coupled to SOC 110 via platform controller 160. NVM 180 represents a nonvolatile memory, including media 182, which is an NVM media, and controller 184 to control access to media 182. In one example, NVM 180 is a memory device coupled to SOC 110 over a peripheral connection, such as PCIe or NVMe (nonvolatile memory express). PCIe can be in accordance with PCI Express Base Specification Revision 4.0, originally released in October 2017 by PCI-SIG, PCI Express Base Specification Revision 5.0, originally released in May 2019 by PCI-SIG, or variations. NVMe can be in accordance with NVMe Express Base Specification, originally released in June 2019 by NVM Express Inc., or a variation.

In one example, system 100 includes main memory 190, which provides primary system memory. Main memory 190 typically includes volatile media 196 to store data in a nonvolatile manner. In one example, main memory 190 includes NVM media 192 and controller 194 to control access to NVM media 192. In one example, system 100 includes cache 170, which includes media 172 and controller 174 to control access to media 172.

The multilevel memory system of system 100 can be configured in any of a number of ways, depending on which memory resources are included and how they are used. Not every implementation of system 100 will include all memory types illustrates. System 100 illustrates different possible variations of memory that can be used in a multilevel system.

More specifically to the subject matter herein, system 100 includes at least one NVM memory that is written asynchronously. For example, system 100 could include main memory 190 with volatile media 196, and NVM 180 as a cache. In another example, system 100 could include main memory 190 with volatile media 196, and NVM media 192 to function as a cache. A typical implementation would include NVM 180 as the nonvolatile memory, but is not limited in this respect.

Typically, cache 170 refers to an auxiliary memory as a close memory, where media 172 can be either a nonvolatile memory that is an auxiliary memory to main memory 190, or can be a cache layer faster than main memory 190. In an implementation where cache 170 is an auxiliary memory, media 172 could be implemented as an NVM media connected to SOC 110 over a link that does not traditionally guarantee data protection end-to-end from the host to the memory media. NVM 180 traditionally is connected over such a link that does not traditionally guarantee data protection end-to-end from the host to the memory media.

SOC 110 represents the host system. Operations by iMC 150, iMC 142, and peripheral control 132 or platform controller 160 can operate on data having a size of a host write unit. In one example, peripheral control 132 includes or is a storage controller for the host. In one example, platform controller 160 includes or is a storage controller for the host. In one example, iMC 142 is the storage controller for the host.

The storage controller for the host operates on a host write unit, while the NVM controller operates on an NVM media write unit. In one example, controller 184 is the media controller that operates on a media write unit. In one example, controller 174 is the media controller that operates on a media write unit. In one example, controller 194 is the media controller that operates on a media write unit. The NVM media operating as a cache for processor 112 can be referred to as "far memory," where far memory refers to a memory whose access time is much slower relative memory resources on SOC 110.

It will be understood that the use of the end-to-end flow control or other data protection can be implemented with any media controller. For purposes of simplicity, the operations will be described with reference to NVM 180 with controller 184.

In one example, SOC 110 provides various data chunks to NVM 180, which are received by controller 184. In one example, the host controller includes a commit indicator in a header with the write command. A commit indicator can cause controller 184 to commit the write data to media 182, whether or not there are enough data chunks or host write units to equal a media write unit or data slice. In one example, when the number of data chunks is not equal to a full media slice, controller 184 writes the data as an RMW (read-modify-write) operation. An RMW operation includes controller 184 reading the target slice from media 182, modifying the relevant portions with the write data from the host, and then writing the entire modified slice.

In one example, controller 184 generates a transaction message for each data transaction, which can include a single write operation or a sequence of writes. The transaction message can indicate whether the data was successfully written to media 182. In one example, the transaction message is a protocol message, or part of a protocol message, or a header of a protocol message. In one example, controller 184 prepares the message to indicate success of the data writes to media 182. In one example, the message indicates success on a sector-by-sector basis, to indicate the success of each host write unit sent to NVM 180.

In one example, reference to NVM media can refer to a block addressable memory device, such as NAND (not AND based gates) or NOR (not OR based gates) flash technologies. In one example, the NVM media can includes a future generation nonvolatile device, such as a three dimensional crosspoint memory device, other byte addressable nonvolatile memory devices that is configured to write at a different granularity than the host write unit. In one example, such a device could have a smaller data write granularity than the host, and the use of data protection can work to ensure that all segments of a host write unit are written correctly. In one example, the NVM media can include a nonvolatile, byte addressable media that stores data based on a resistive state of the memory cell, or a phase of the memory cell. In one example, the memory device can use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random-access memory (FeTRAM), magnetoresistive random-access memory (MRAM) memory that incorporates memristor technology, or spin transfer torque (STT)-MRAM, or a combination of any of the above, or other memory.

Consider an example where NVM 180 operates as a cache for SOC 110, and where NVM 180 is connected via a PCIe link. PCIe includes an acknowledgement mechanism to notify the host that the protocol layers of NVM 180 successfully received the packets and data for a data transfer. However, an error in controller logic or in the media (i.e., an error past the protocol layers) could corrupt data or even prevent data from being written to media 182. In one example, controller 184 can generate a transaction message to indicate errors or indicate that all writes were successful, for each data transfer from SOC 110. In one example, the transaction message can indicate a number of errors per host write unit. Such a transaction message can ensure data protection all the way to the media, instead of just to the protocol layers.

Consider an example where NVM 180 operates as a cache for SOC 110, and where NVM 180 is connected via an NVMe link. NVMe can provide error logging for controller 184, such as through NVMe SMART/Health information log. Controller 184 can generate and send such a log to the host, such as through an asynchronous event request (AER) or other mechanism. However, it will be understood that NVMe only provide for such a log to be maintained at the memory device and communicated at random times. In one example, controller 184 can generate a transaction message to indicate errors or indicate that all writes were successful, for each data transfer from SOC 110. Thus, rather than keeping a log to randomly return to the host, controller 184 can generate a report for each data transfer.

In general, when NVM 180 or other NVM media in system 100 is used as an upper level memory or second level memory (e.g., 2LM implementation), the host controller needs to transfer frequently used data by processor 112 (e.g., a central processing unit or CPU) to the NVM media for caching. For such systems, the cached data can be directly used by processor 112, which increases the need for the data to be correctly written to avoid execution errors.

In one example, the granularity between host and media transfers is different with the host writing data in multiple sectors to sequential addresses. In such an example, data protection can ensure that each data sector gets committed to the NVM media. If a data sector is not committed to the media due to a controller or media error, system 100 enables the media controller to notify the host as soon as possible. Quicker notification to the host enables the host to take appropriate error handling steps. In one example, the host storage controller performs error handling as well as notifying a cache controller of the processor (such as a controller for cache 122, not specifically shown). When the host knows that the data was properly committed to the far memory media, it can free up its internal buffer and other resources to execute other tasks.

In one example, the host storage controller or host controller maintains write credits to implement end-to-end flow control for host writes to far memory media. Such write credits could be referred to as far memory write credits (FMWC). In one example, both the host controller and the NVM media controller maintain write credits to implement end-to-end flow control for host writes to far memory media.

In one example, the host controller contains one or more programmable registers to indicate maximum far memory write credits. The maximum FMWC indication can indicate a maximum number of writes that can be pending at the NVM device. In one example, the maximum number of writes pending at the NVM device refers to the maximum number of write transactions. In one example, the maximum number of writes pending refers to the maximum number of NVM media write units requested to be written.

In one example, system 100 implements a flow control initialization mechanism between the host controller and the media controller at system boot up. In one example, the flow control initialization allows the host controller to communicate the maximum FMWC information to the media controller. The maximum FMWC can be programmed into the host controller as part of system configuration. In one example, the host controller sets the maximum value based on preconfiguration for the specific NVM device coupled to the host. In one example, the host sends a configuration command to the media controller to set the number of write credits. In one example, the host sends a configuration command to set the number of write units per write credit, which could be the same configuration command.

In one example, the host controller and the media controller reserve credits by incrementing or decrementing a value to indicate the number of write credits. In an incrementation configuration, the value can start at zero, and be incremented for each write credit used, to be compared against a maximum value. In a decrementing configuration, the value can start at the maximum value and be decremented for each write credit used, down to zero.

Consider an example where NVM 180 operates as a cache for SOC 110, and where NVM 180 is connected via a PCIe link. In one example, controller 184 generates a vendor defined message (VDM) transaction layer packet (TLP) as the transaction message. PCIe allows the use of a proprietary Write_GO VDM TLP for the host controller and the media controller to communicate about the write transaction. In one example, the VDM TLP enables the media controller to indicate to the host controller the number of sectors of write data that were committed successfully to the memory media. In one example, fields in the message can be used to communicate information about errors that may have occurred during media controller processing of the memory write and media commit process.

With the use of write credits, the host can manage the number of writes pending to the memory. With the transaction message, the system can track in realtime which units of data have been committed to the media, allowing the host to free up its internal cache buffer and other compute resources to focus on other tasks as soon as the data transfer completes. In one example, error information will enable the host controller to perform error handling operations as soon as a data transfer failure is detected. The prompt availability of error information is expected to reduce the complexity of error handling, reducing the resource requirements for error handling. In one example, the transaction message provides error information, which can eliminate the need for the host controller to read an error log from the memory device, which can improve link bandwidth.

For a link protocol that provides data flow control from the host to the memory device, the protocol flow control becomes redundant when the memory subsystem provides end-to-end flow control. Thus, the link flow control may be unnecessary. For example, PCIe flow control would be redundant and PCIe posted credit limits could be set to 'infinite' for the given function. Setting the credit limits to infinite would eliminate the need for periodic UpdateFC (flow control update) transmission for the given function, which will reduce link bandwidth by reducing periodic DLLP overhead.

For a transaction message that is based on a protocol message (e.g., a PCIe VDM TLP), the system can maintain compliance with the protocol specification. Maintaining compliance with the link spec should allow full reusability of generic endpoint controller design, for the physical layer, link layer, and transaction layer. In one example, the transaction message is a custom message. In one example, the transaction message is a customized version of a message available in a link protocol specification.

Figure 2:
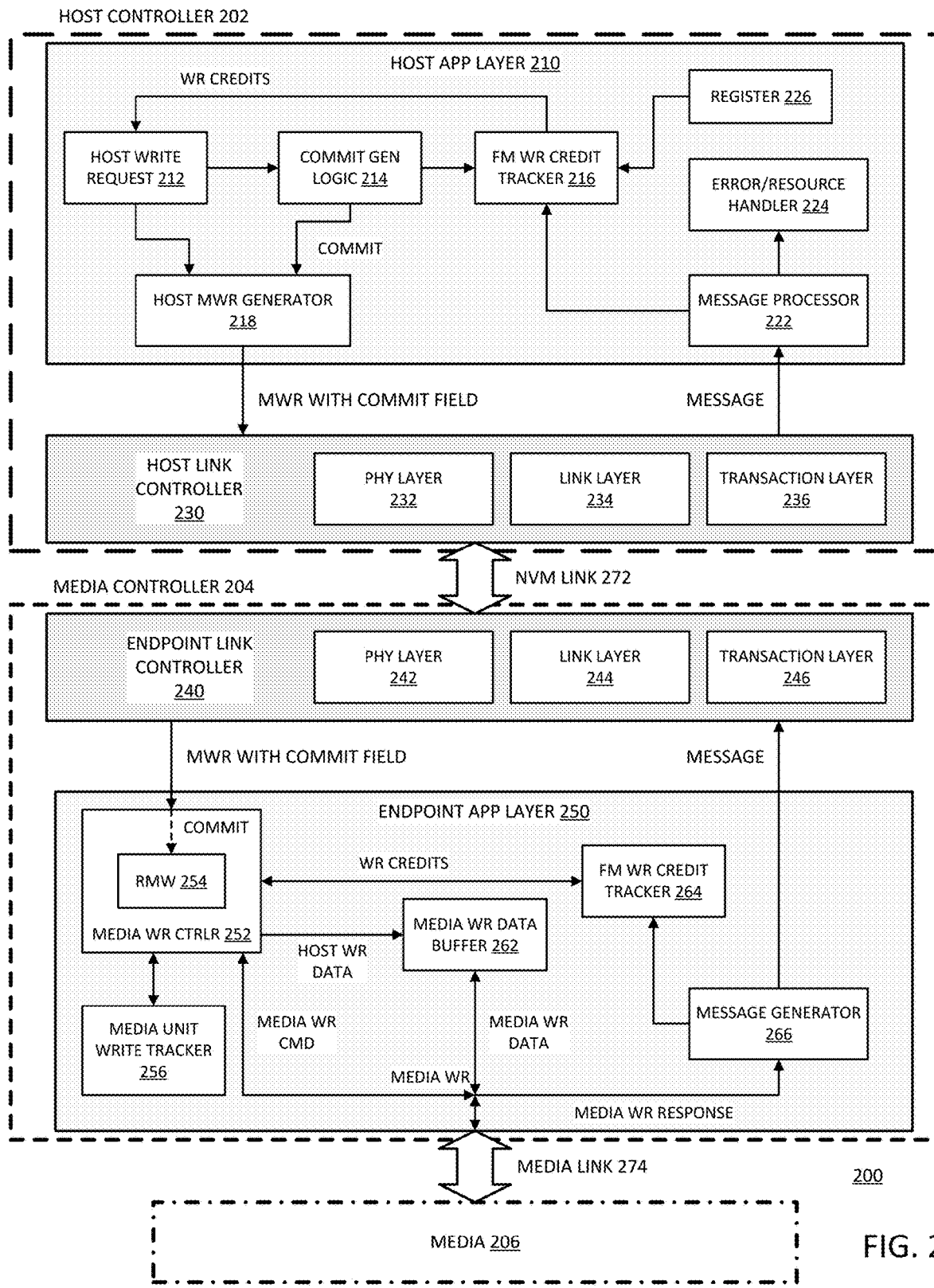
FIG. 2 is a block diagram of an example of controllers for a multilevel memory system with different write data unit granularities, with components to exchange a message to indicate when data is committed to memory.

FIG. 2 is a block diagram of an example of controllers for a multilevel memory system with different write data unit granularities, with components to exchange a message to indicate when data is committed to memory. System 200 illustrates host controller and media controller components in accordance with an example of system 100. Elements of host controller 202 are illustrated within the long-dashed box. Elements of media controller 204 are illustrated within the short-dashed box. In one example, host controller 202 is a PCIe host 202 and media controller 204 is a PCIe endpoint.

In one example, host controller 202 includes host application (APP) layer 210 and host link controller 230. In one example, host application layer 210 includes host write request 212, commit generation logic 214, far memory (FM) write (WR) credit tracker 216, and host memory write (MWR) generator 218. Host write request 212 initiates a memory write request to write data sectors to media 206 managed or controlled by media controller 204. In one example, host application layer 210 can be configured to know the size of the media write unit (e.g., slice size) and what sizes of writes supported by media 206.

Host write request 212 notifies or forwards the memory write request to commit generation logic 214 and host MWR generator 218. In one example, commit generation logic 214 tracks the number of host write units written of the various media write units, and can generate corresponding associated commit indicators for the media write units for host MWR generator 218. It will be understood that the system will not have multiple host write units in-flight at a time. Thus, commit generation logic 214 will only need to take care of the host write unit that is currently ongoing. The commit indicators indicate to media controller 204 whether the associated media write units are to be written to media 206. In one example, media controller 204 accumulates host write units until filling an entire media write unit before committing the data to media 206. When host controller 202 sets the commit indicator, media controller 204 will write the associated media write unit to media 206 whether or not the media write unit is full. Such a write can be performed, for example, by executing a read-modify-write operation.

In one example, host MWR generator 218 generates the write requests (e.g., a write TLP) to send to media controller 204, based on the host write units provided by host write request 212 and the commit indicators provided by commit generation logic 214. In one example, host MWR generator 218 places the commit indicators in corresponding fields in the headers of the TLPs. In an implementation with PCIe, in one example, the commit indicator of each media write unit is stored in a reserved field in the header of the TLP.

In one example, host application layer 210 includes FM WR credit tracker 216. FM WR credit tracker 216 represents logic for host controller 202 to track or maintain FM write credits to be written to media 206 by media controller 204. In one example, FM WR credit tracker 216 provides write credit information to host write request 212. The FM write credit information is represented as WR credits in system 200. FM WR credits indicate whether there are FM write credits available to send a write request to the memory media. In one example, host write request 212 only generates the write request if there are available FM write credits as indicated by FM WR credit tracker 216. In one example, the availability of FM write credits indicates an available number of writes that can be made to the media.

In one example, host application layer 210 includes message processor 222 and error/resource handler 224. Message processor 222 represents logic in the application layer to process a message from media controller 204. The message can be a transaction message or include a transaction message in accordance with any example described. The transaction message can indicate if there were errors writing the data to media 206 or whether all host data was successfully written to the media. Error/resource handler 224 represents logic in host application layer 210 to perform error handling if the message indicates errors in committing the data to media 206.

Host controller 202 includes host link controller 230. Host link controller 230 represents the controller over NVM link 272 to connect to the NVM device. Host link controller 230 can include physical layer 232, link layer 234, and transaction layer 236. The different layers can be referred to as portions of the protocol stack. Physical layer 232 can control the physical interface components. Physical layer 232 could be subdivided into logical and electrical sublayers, where the physical-logical sublayer can further include a physical coding sublayer (PCS).

Link layer 234 can manage the connection between the devices. Link layer 234 can be referred to as a data link layer, which could be subdivided to include a media access control (MAC) sublayer. Transaction layer 236 can manage the packets and headers associated with a transaction between the devices. Transaction layer 236 can perform tasks related to packetizing and de-packetizing data and status-message traffic. In one example, host link controller 230 represents a host-side PCIe Controller. Host link controller 230 can perform tasks including but not limited to sending the memory write requests and transactions with host data to be written to media 206, including associated commit indicators for the media write units.

In one example, host link controller 230 can direct successive memory writes to different media write units. The different media write units may or may not be adjacent to each other. The directing of successive memory writes can be for either contiguous or non-contiguous host write units of the same media write unit.

In one example, media controller 204 includes endpoint link controller 240 and endpoint application (APP) layer 250. Media controller 204 includes endpoint link controller 240. Endpoint link controller 240 represents the controller over NVM link 272 to connect from the NVM device to the host. Endpoint link controller 240 can include physical layer 242, link layer 244, and transaction layer 246. The layers of endpoint link controller 240 can be similar to those of host link controller 230, for the endpoint instead of for the host. Endpoint link controller 240 can perform tasks including but not limited to receiving the memory write requests and transactions with host data to be written to media 206, including associated commit indicators for the media write units.

In one example, media controller 204 includes endpoint application layer 250. In one example, endpoint application layer 250 includes media write (WR) controller (CTRLR) 252, media write (WR) data buffer 262, and media unit write tracker 256.

In one example, media write controller 252 controls the operation of media write data buffer 262 and media unit write tracker 256 to control the writing of data into media 206. Media write controller 252 can receive the write request with the commit field (MWR with commit field) from endpoint link controller 240. In one example, the controller determines if the commit bit is set to determine how to commit the data to media 206. In one example, media write controller 252 includes RMW 254 to represents the read-modify-write operation that the controller could control in response to a commit bit. In one example, the controller will cause operations to commit an entire media write unit to media 206 in response to receipt of a number of host write units equal to the media write unit.

In one example, media write data buffer 262 buffers host data for a media write unit to be written to media 206 until the host write units of the received data are written. In one example, media unit write tracker 256 tracks the writing of the various media write units to the media 206. As illustrated, media write controller 252 can provide the media write command (WR CMD) and trigger media write data buffer 262 to provide the media write data to be combined as a media write (WR), as illustrated in endpoint application layer 250. Media write controller 252 can provide host write (WR) data to media write data buffer 262 to be buffered. Once the data is to be written, either as a complete media write unit or as an RMW operation, the host write data accumulated in the buffer provides the media write data for the commit operation.

In one example, endpoint application layer 250 includes far memory (FM) write (WR) credit tracker 264 and message generator 266. In one example, FM WR credit tracker 264 functions similarly to FM WR credit tracker 216 of host application layer 210, when both the host and the memory device track write credits. FM WR credit tracker 264 represents logic for media controller 204 to track or maintain write credits for media controller 204. In one example, FM WR credit tracker 264 provides write credit information to media write controller 252. The write credit information is represented as WR credits in system 200. WR credits indicate whether there are write credits available to process and execute an incoming write request. In one example, media write controller 252 issues an error alert if a write request is received from the host and there are no write credits available. Tracking the write credits at media controller 204 can ensure that the host controller and the media controller are coordinated on the execution of a write request to media 206.

In one example, FM WR credit tracker 216 of host controller 202 and FM WR credit tracker 264 of media controller 204 both track write credits. In one example where both track write credits, they can track the write credits independently of each other. In one example, the different controllers utilize the credit count for different purposes. For example, host controller 202 can utilize the credit tracking to determine whether to send a write request, while media controller 204 can utilize the credit tracking to determine overflow.

In one example, endpoint application layer 250 includes message generator 266. Message generator 266 represents logic in the application layer to generate a message to host controller 202. The message can be a transaction message or include a transaction message in accordance with any example described. The transaction message can indicate if there were errors writing the data to media 206 or whether all host data was successfully written to the media. Endpoint application layer 250 can provide the message to endpoint link controller 240, which communicates the message over NVM link 272 to host link controller 230. Host link controller 230 can provide the message to message processor 222 of host application layer 210 for processing.

In one example, the message is formatted in accordance with a standard applied by the link controllers. For example, if host link controller 230 and endpoint link controller 240 are PCIe controllers, the message could be a VDM format. In one example, a VDM message configured with the link protection information can be referred to as a Write_Go VDM message. The use of a message format in accordance with the standard link control can ensure the use of standard physical layer, link layer, and transaction layer for both the host and the endpoint. The use of a standard message format can eliminate the need for a sideband signal over the link, which enables the use of standard link controller components and use of changes only in the application layers.

In one example, host controller 202 is implemented in hardware, such as being part of the host processor, implemented with an application specific integrated circuit (ASIC), programmable circuit such as a field programmable gate array (FPGA), a programmable logic device (PLD), or other circuitry. In one example, media controller 204 is implemented in hardware, such as implemented with an ASIC, FPGA, PLD, or other circuitry. In one example, host controller 202 includes firmware or software components, such as code executed on a hardware element. In one example, media controller 204 includes firmware or software components, such as code executed on a hardware element.

System 200 can use media 206 for a 2LM application where host controller 202 transfers data frequently used by the host CPU or host processor (not specifically shown) to media 206 for caching, In one example, media controller 204 provides a message to indicate data commit status and error tracking on a per slice granularity. End-to-end data protection can ensure the data write to media completed successfully.

In one example, the FM write credits in system 200 are system-level credits for the memory system. In one example, the FM write credits have a granularity of a media write unit; thus, one FM write credit can be used to track the write of one media write unit. It will be understood that a media write unit could be committed based on an amount of host write units not equal to a media write unit, in which case the FM write credit can track a media write unit written as part of an RMW operation. In one example, one FM write credit is for one write operation. In one example, one FM write credit is for multiple write operations to the NVM media.

In one example, the maximum number of FM WR credits is programmable. In one example, the maximum number is configured in register 226 of host controller 202. In one example, when system 200 boots up (e.g., a cold boot), host controller 202 can determine the maximum FM WR credits from register 226 and use credit initialization to transfer maximum FM WR credit information to the media controller 204. The credit initialization could be implementation specific. In one example, the credit initialization uses VDMs to transfer maximum FM WR credit information to media controller v204. In one example, host controller 202 utilizes vendor-specific extended capability (VSEC) in PCIe and PCIe configuration write/read TLPs to transfer the maximum FM WR credit information. Media controller 204 can capture the information and apply it to FM WR credit tracker 264 to determine credit overflow when far memory traffic starts flowing.

The following provides an example of end-to-end flow control and error communication/handling with media controller 204 acting as a far memory controller and host controller 202 as the host. For the following description, host link controller 230 and endpoint link controller 240 are assumed to be PCIe controllers, and various messages are described in reference to PCIe. It will be understood that use of comparable messaging can be used with a different link protocol.

In one example, when host controller 202 receives a far memory write request (such as from a CPU cache controller), host controller 202 uses the FM WR credit count from FM WR credit tracker 216 to determine whether the far memory write can be sent to media controller 204. If number of FM WR credits available is greater than zero, in one example, host controller 202 will send out the far memory write request. Commit generation logic 214 can determine whether to set a 'commit' bit or other commit indicator in a PCIe MWR TLP. In one example, commit generation logic 214 will only set the commit bit when the last sector of host data is sent to media controller 204. Thus, the commit bit can indicate the last host write unit for a write transaction. In one example, a write credit is associated with multiple writes, and the number of writes and the number of write within the total number can be indicated within the TLP or a request VDM.

In one example, if the commit bit is set (e.g., having a value of '1' in an outbound PCIe MWR TLP), FM WR credit tracker 216 will adjust the FM WR credit count. In one example, the adjustment is subtracting 1 from the count. In one example, host application layer 210 causes the PCIe MWR TLP with the commit bit (set to either 0 or 1) propagates through PCIe physical layer 232, link layer 234, and transaction layer 236 in host link controller 230 and through PCIe physical layer 242, link layer 244, and transaction layer 246 in endpoint controller 240. The PCIe MWR TLP reaches endpoint application layer 250 through the PCIe controllers.

In one example, media write controller 252 checks for credit overflow using credit information in FM WR credit tracker 264. In one example, if media write controller detects a credit overflow, it is considered a fatal system error and endpoint application layer 250 does not process the PCIe MWR TLP and discards the PCIe MWR TLP. If credit overflow is not detected, endpoint application layer 250 processes the write to either accumulate the data in media write data buffer 262 or to send a complete media slice write.

In one example, if the commit bit is set in the inbound PCIe MWR TLP, in one example, FM WR credit tracker 264 can adjust the FM WR credit count in media controller 204. For example, the FM WR credit count can be decremented. After writing the data to media 206, the media provides a response to endpoint application layer 250. In one example, when the media write response is received, message generator 266 generates a VDM message. In one example, the VDM message includes a field to indicate what sectors of data were committed and what was the status of the write of each sector. Message generator 266 can transmit the VDM message through NVM link 272 as a PCIe link. In one example, message generator 266 can indicates to FM WR credit tracker 264 to return a FM WR credit, such as by incrementing the credit count by 1.

In one example, the VDM message is included within a VDM TLP or a Write_GO VDM TLP, which is transmitted through PCIe physical layers, link layers, and transaction layers in the host and endpoint controllers to reach message processor 222 as a VDM processor in host application layer 210 of host controller 202. In one example, message processor 222 utilize information in the message, such as a Sector_RxWritten field to confirm whether all sectors the host intended to write to media 206 were successfully written. In one example, message processor 222 checks a status field (e.g., STS[2:0]) to ensure no far memory write errors were reported. In one example, message processor 222 notifies FM WR credit tracker 216 about receipt of the VDM to cause the tracker to return a write credit, such as incrementing the credit count by 1. Thus, in one example, the VDM can provide control over write credits and error messaging.

In one example, if the message indicates an error, either that not all desired sectors were committed to media or there was an error committing the data to media 206. Examples of errors that could be reported can include UR (unsupported request) and CA (completer abort) errors. In response to an error, error/resource handler 224 can perform error handling tasks. In one example, error/resource handler 224 notifies a processor cache controller of the errors. If message processor 222 does not detect an error, in one example, error/resource handler 224 frees up buffer and other resources that were allocated for the given far memory write.

FIG. 3 is a representation of an example of a message to indicate when data is committed to memory. Message 302 represents an example of a transaction message to be sent to a host from a memory device, such as what is described with respect to system 200. In one example, message 302 is an example of a VDM TLP, such as a Write_GO VDM TLP. Message 302 can be a VDM in accordance with PCIe with customizations to enable end-to-end data protection. In one example, the exchange of the Write_GO VDM provides a return for write credits as well as to communicate error status information from the media controller to the host.

In one example, message 302 can be the same as a standard PCIe VDM, with customization header fields such as VDM Type, Requester ID, Message Code, Tag, Bus Number, Device Number, Function Number, and Vendor ID. In one example, message 302 includes vendor defined data fields (bytes 12-15) utilized to convey information on number of sectors written successfully, error status for end-to-end data transfer, and vendor message. These three fields are identified with a darker fill.

Message 302 shows an example of a Write_GO VDM TLP format for the case of four sectors/slice. Row 312 illustrates the relative byte position for message 302. Row 314 represents different bits of the message bytes.

Row 322 includes various fields for a PCIe message. In one example, the message is routed by ID. In one example, the TC (traffic class) Memory Parameter can indicate the class of traffic, such as far memory traffic. Row 324 can include a requester ID (identifier) and a tag for memory write. In one example, the requester ID includes a device bus/device/function indicator that is latched by the far memory controller PCIe core during enumeration. In one example, row 324 includes a message code with a vendor defined type. In one example, the Tag field indicates a corresponding far memory write for which the Write_GO VDM completion of message 302 is meant.

In one example, row 326 includes bus number, device number, and function number fields, which can be the Request ID field copied from a far memory write request sent by the host controller. In one example, the Vendor ID can indicate a vendor of the devices for which message 302 applies.

In one example, row 328 includes custom fields including Sector Written or Sector_RxWritten, Status or STS, and Vendor Message. In one example, the Vendor Message can be a value to indicate the type of message 302. In one example, the Status field can be indicated as STS[2:0], which can provide the status of the write to the memory media. Status field 304 is illustrated with an example of different values that can be used as status indications. Status field 304 illustrates an example of a Write_GO VDM STS field encoding. It will be understood that the different descriptions can apply to the values indicated, or could be modified to apply to different bit encodings. It will also be understood that while a 3-bit encoding is illustrated, more or fewer bits can be used to indicate the message status.

In one example of status field 304, a value of '000' indicates a successful write to media. In one example, a value of '001' is a 'UR' message, which indicates an unsupported request. When the memory device returns a UR message, the host can perform error handling. An example of an unsupported request can be a request to access out of an access range or a request to an unsupported region. In one example, a value of '100' is a 'CA' message, which indicates a completer abort. A completer abort refers to the memory media being unable to complete the requested write because of a fatal exception. An example of a fatal exception is a request that is received when there are no write credits available at the media. The host can perform error handling in response to a completer abort message. For purposes of status field 304, all other bit encodings can be reserved, but it will be understood that other status or error messages can be indicated with the status bits.

In one example, the Sector Written field or Sector_Rx-Written can be part of Byte 12 of message 302 with the Status Field (such as what is illustrated with respect to status field 304), considering message 302 to include 16 bytes identified as Byte[0:15], where Byte 0 includes the FMT and Type fields. In one example, message 302 uses Sector Written to define sectors committed successfully to the media using one-hot encoding. With the one-hot encoding, each bit in the field can represent a different sector. In one example, the number of bits used in the Sector Written field depends on the number of sectors in a media slice. It will be understood that rather than using a single bit per sector, the memory device could return a binary number to indicate a success state truth table. In one example, where each bit represents a specific sector, the bit position can be thought of as an address offset for the sector.

In an implementation where each bit the Sector Write field corresponds to a host write unit of a media write unit, in one example, the value of the bits can be understood as follows. If the media controller sets the bit to '1', it indicates the host write unit is received from the host controller and being committed to the media successfully. If the media controller sets the bit to '0', it indicates a host write unit is not successfully written to the media. It will be understood that lack of success in writing the host write unit to the media can be a result of the host write unit not being received from the host controller (e.g., due to a partial write case in which an RMW operation is performed in response to a commit bit) or the media controller attempted to write the host write unit to media, but there was an error.

It will be understood that message 302 includes certain fields that can be identified with a PCIe connection. Message 302 is not limited to PCIe. Message 302 represents a transaction message to indicate address or a value to identify specific host write units as well as a status or message regarding the writing of the host write units to the memory media. The status and indication for specific host write units can be applied to any transaction message for a link protocol. The sending of such information can provide end-to-end data protection, ensuring what host write units were successfully committed to the media.

In one example, the media controller will use message 302 or a comparable message to perform flow control to indicate the receipt of the write transaction. Such a message exchange can be the same as, or similar to, what is traditionally performed to ensure flow control for the link between the host and the memory device. In one example, the media controller adds other information to the transaction message as indicated in message 302 to indicate not just the health of the link through the link flow control, but to indicate the success of committing the data to the storage media of the memory device. Thus, instead of simply indicating a successful transaction exchange over a communication link, message 302 can be extended with the transaction message information to indicate a successful write of the data to the media. Thus, in one example, the media controller can wait to send a return message until committing the data to media. In one example, the transaction message of message 302 is separate or in addition to a link communication message. By indicating the committing of the data to the media, the host can know when the data is written to media and when it is available for access, while having assurance that it has been written correctly.

Figure 4:
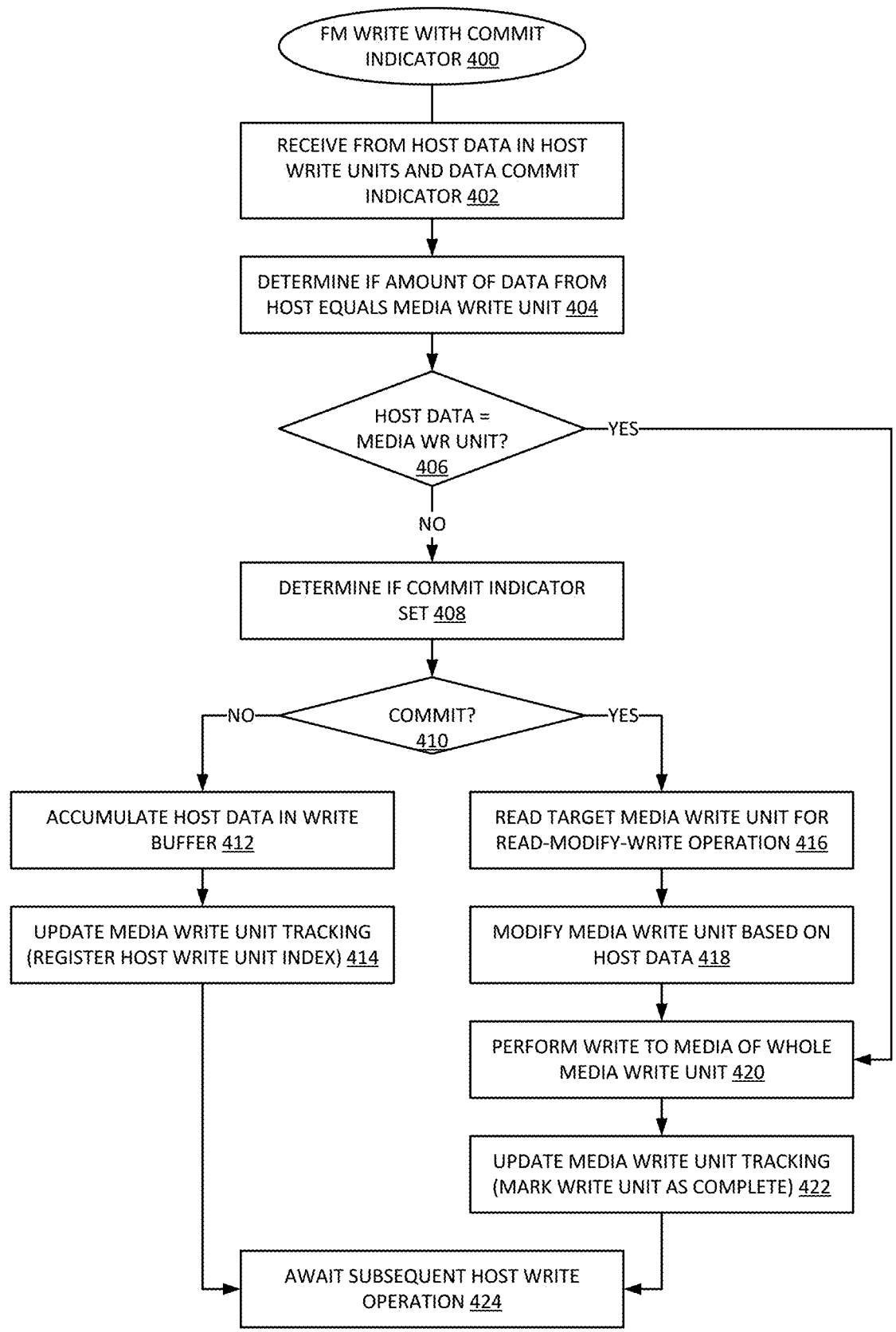
FIG. 4 is a flow diagram of an example of a process for writing data in a multilevel memory system with different write data unit granularities with a commit indicator.

FIG. 4 is a flow diagram of an example of a process for writing data in a multilevel memory system with different write data unit granularities with a commit indicator. Process 400 represents a process for writing media write unit in storage media or memory media in a system that has differential data granularities between the host write units and the media write units. In one example, process 400 can be executed by a media controller or a controller at the memory device used to store the data.

In one example, the controller receives data from the host in host write units of granularity for a write operation. The write operation is to be triggered by a request that can include a data commit indicator, at 402. In one example, the controller determines if the amount of data received from the host equals a media write unit, at 404.

In one example, if the host data amount is equal to the media write unit size, 406 YES branch, the controller can perform a write of a complete media write unit to the media, at 420. If the amount of host data is not equal to the size of the media write unit, 406 NO branch, in one example, the controller determines if the write request has a commit indicator set, at 408. The commit indicator can be a bit or a field to indicate that the data received is to be committed to the media, whether or not a full media write unit has been received.

In one example, if the commit indicator is not set, 410 NO branch, the controller accumulates the host data in a write buffer, 412. The accumulation of the data can allow the controller to receive data in more than one write request. In one example, the host controller can write data out of order, or in chunks of data that are not contiguous in the media. Thus, the host controller can send portions of data for multiple different media write units together, and can indicate a commit bit for different media write units. Thus, in one example, the media controller can accumulate data in a write buffer for more than one media write unit. In one example, in response to storing data in a write buffer, the media controller can update media write unit tracking, such as registering the host write unit write in a host write unit index kept by the media controller, at 414.

In one example, if the commit indicator is set, 410 YES branch, the controller can read portions or all of the target media write unit for a read-modify-write operation, at 416. In one example, the controller retrieves only portions of the media write unit that have not been received from the host. The controller can then modify the media write unit based on the host data received, at 418.

In one example, either in response to a commit indicator as through the commit determination at 410, or through having a complete media write unit to write as through the determination at 406, the controller can perform a write the media of a whole media write unit, at 420. In one example, in response to a media write, the controller updates media write unit tracking, such as by marking a write transaction for a specific write unit complete, at 422. After either updating write unit tracking at 422 for a full write or updating media write unit tracking at 414 for data accumulation, in one example, the controller can await a subsequent host write operation or write request from the host, at 424. In one example, the controller performs other operations related to preparation of a write transaction message, such as what is described with reference to process 500.

Figure 5:
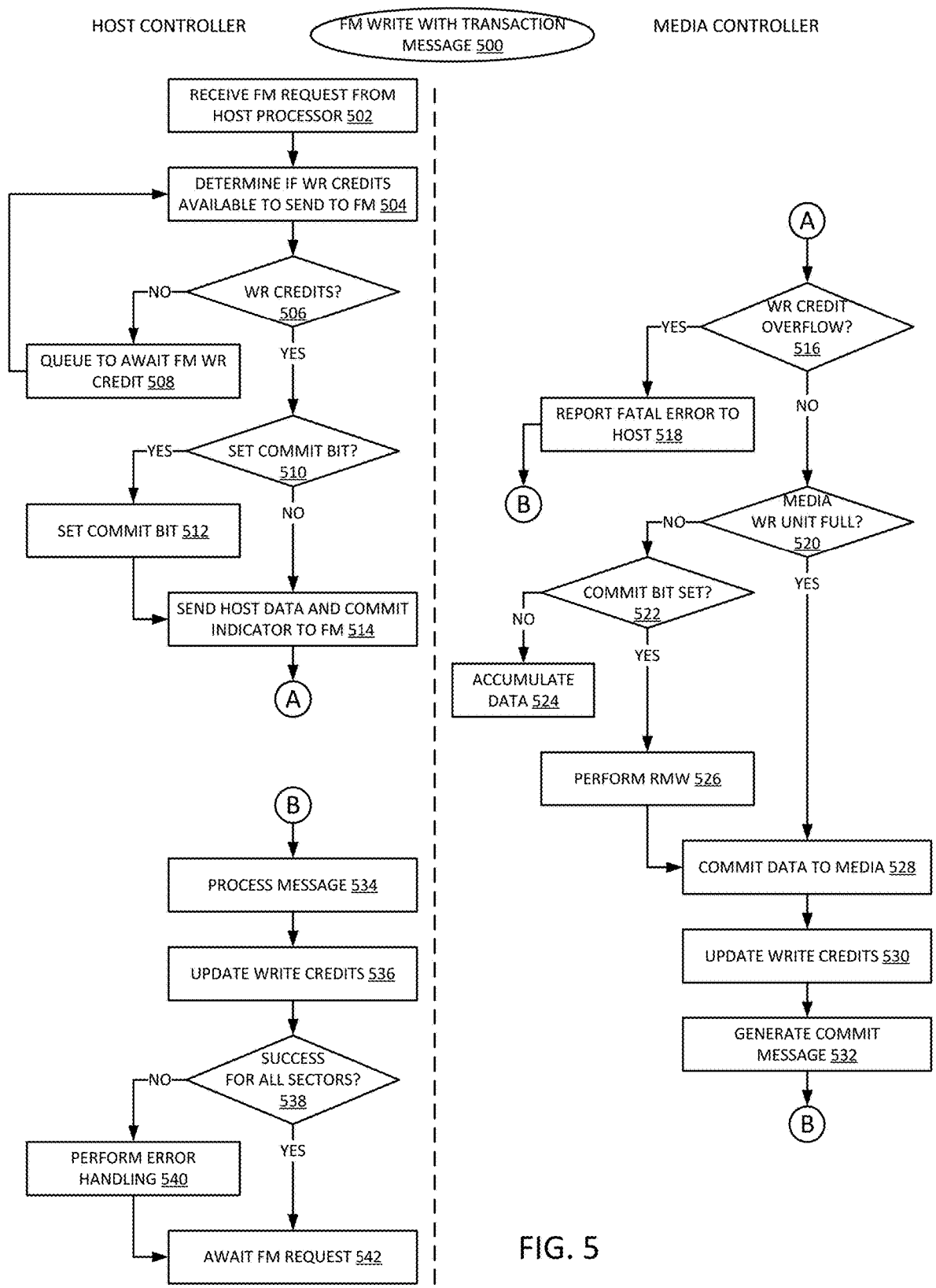
FIG. 5 is a flow diagram of an example of a process for writing data in a multilevel memory system with different write data unit granularities, including use of a message to control write credits.

FIG. 5 is a flow diagram of an example of a process for writing data in a multilevel memory system with different write data unit granularities, including use of a message. The message can provide data protection through to the commit to media. In one example, the process can be used to control write credits.

Process 500 represents a process for use of a transaction message in a write to media having a different write unit granularity as the host generating the write request that is the subject of the write transaction. Process 500 can provide end-to-end data protection. In one example, process 500 also controls the use of write credits. The operations of process 500 are illustrated as being split between the operations of the host controller and the media controller.

In one example, the host controller receives a request from the host processor for data from far memory (FM), at 502. In one example, the host controller determines if there are write credits available to send the write request to the far memory, at 504. If there are not write credits available, at 506 NO branch, in one example, the host controller queues the request to await for an available far memory write (WR) credit, at 508. The host controller can wait in this pattern, returning from 508 to 504 until a write credit becomes available.

In one example, if there is a write credit available, at 506 YES branch, the host controller determines whether to set a commit bit with the write request, at 510. In one example, the host controller only sets the commit bit or commit indicator when other data in a media write unit will not be written, and thus, all the data that will be written to a particular media write unit is being sent or will have been sent based on the current write request and one or more previous write requests (e.g., with accumulated data at the memory device).

If the memory controller determines not to set the commit bit, at 510 NO branch, the host controller can send the host data and the negative commit indication to the far memory, at 514. In one example, the host controller determines to set the commit bit, at 510 YES branch, and sets the commit bit, at 512. After setting the commit bit, the host controller can send the host data and the affirmative commit indicator to the far memory, at 514.

In one example, in response to receipt of the write request, including the host data and the commit indicator, the media controller determines if there is a write credit overflow, at 516. A write credit overflow can indicate receipt of a write request from the host for a new write transaction when there are no available write credits. In theory, the host controller would not send a write request that would cause a write credit overflow if the host controller is tracking the write credits. However, extra protection at the media controller can avoid an error.

In one example, if a write credit overflow occurs, at 516 YES branch, the media controller can generate a fatal error message to report to the host, at 518. In one example, the host controller will process the fatal error message with a message processor as described in more detail below, and which is illustrated in process 500, at 534.

If there is no write credit overflow, at 516 NO branch, in one example, the media controller determines if the amount of data received makes a full media write unit, at 520. It will be understood that the media controller could determine the status of the commit bit prior to making a determination about whether the media write unit is full. In such a case, the media controller may determine whether the data makes a full media write unit for the case where the commit bit is set and for the case where the commit bit is not set. The order of the operations is not necessarily significant. Rather, the system can apply the understanding of a commit bit if one is used, and the media controller signals back to the host with the message as described to indicate the success or error of a commit to media.

In one example, if the media write unit is not full, at 520 NO branch, in one example, the media controller determines if the commit bit is set, at 522. If the commit bit is not set, 522 NO branch, in one example, the media controller accumulates the data, at 524. While not explicitly shown in process 500, the media controller could perform other operations associated with accumulating data, and return to waiting for a subsequent write request. In one example, if the commit bit is set, at 522 YES branch, the media controller will commit the data to the media even though there is not a full media write unit. In one example, the media controller performs an RMW operation, at 526. The RMW operation preparation can include reading the data from the media that is the target of the host write, so the media controller can be ready with the un-changed data, as well as being able to modify the data that will be written.

In one example, if the host data provides a full media write unit, at 520 YES branch, or after the media controller has prepared the full media write unit with an RMW operation at 526, the media controller can commit the data to the media, at 528. In one example, the media controller updates its local tracking of the write credits in response to committing a media write unit to media, at 530. The committing of the media write unit can indicate the completion of a write transaction for which a write credit can be freed, assuming one media write unit per write credit. In an example where a write credit allows for more than one write, the media controller can update the information related to the write credits to indicate the commit.

In one example, the media controller generates a commit message or a transaction message to send to the host to indicate the commit of the data to the media, at 532. In one example, in response to either a transaction message after a commit or in response to an error message for a fatal error, the host controller processes the message received, at 534. In on example, the host controller updates the host-side write credits based on receipt of a commit transaction message, at 536.

In one example, the host controller determines from the message if there was success for all sectors of the write transaction, at 538. If there was not success in writing all sectors to media, at 538 NO branch, the host controller performs error handling, at 540. The specifics of error handling are outside the scope of this discussion. The host controller can perform operations related to determining the error and addressing it. After error handling at 540 or after determining that there was success in writing all sectors to media, at 538 YES branch, the host controller can await a subsequent far memory request, at 542.

Figure 6:
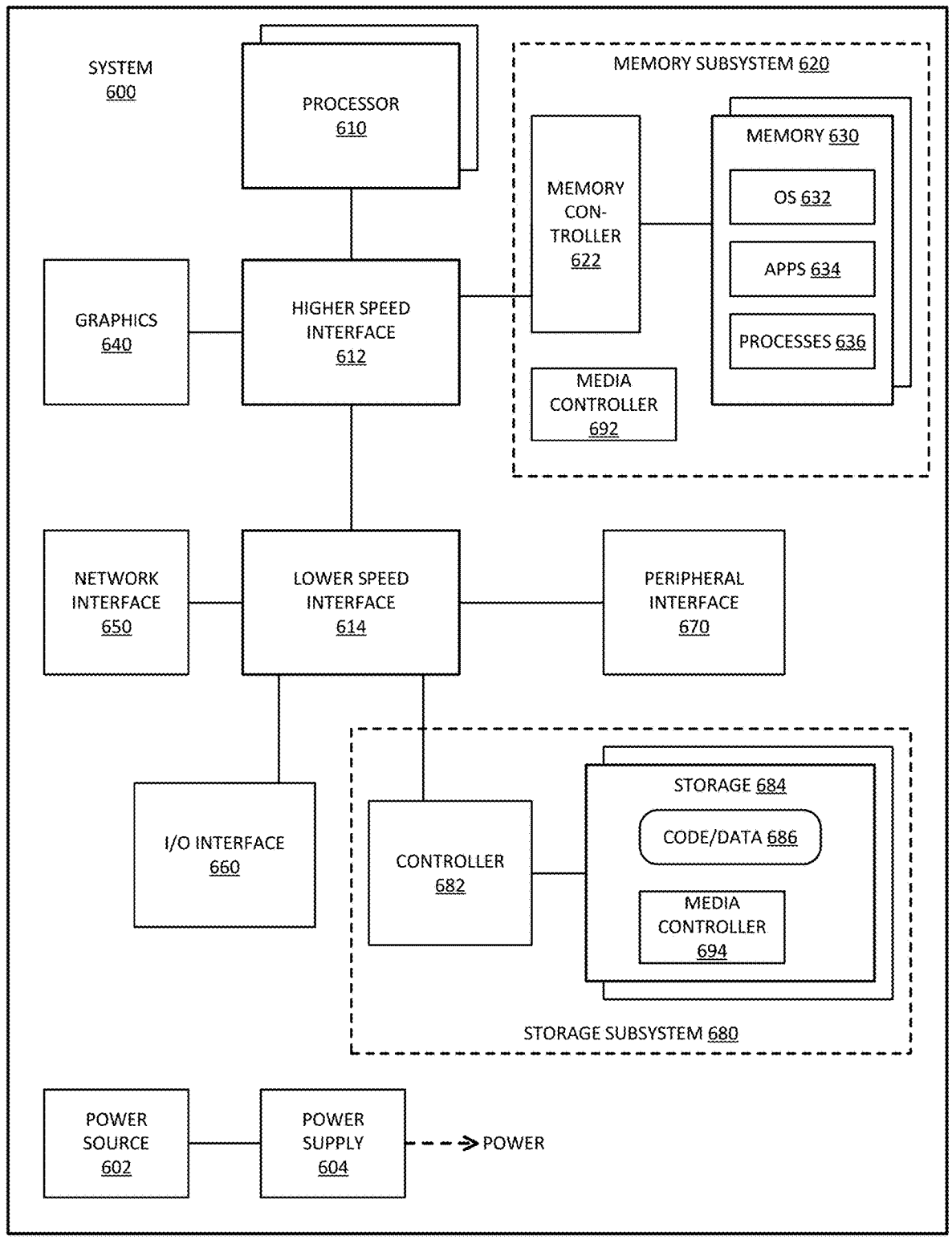
FIG. 6 is a block diagram of an example of a computing system in which a multilevel memory system with different write data unit granularities with a commit message can be implemented.

FIG. 6 is a block diagram of an example of a computing system in which a multilevel memory system with different write data unit granularities with a commit message can be implemented. System 600 represents a computing device in accordance with any example herein, and can be a laptop computer, a desktop computer, a tablet computer, a server, a gaming or entertainment control system, embedded computing device, or other electronic device.

System 600 provides an example of a system with components in accordance with system 100 of FIG. 1. In one example, system 600 includes a host controller such as a controller in memory subsystem 620, that generates write requests to a nonvolatile media having a different write unit than the write unit of the host controller and processor. In one example, system 600 includes media controller 692 for a nonvolatile media in memory subsystem 620 that receives far memory write requests and generates transaction messages in accordance with any description herein. In one example, system 600 includes media controller 694 for a nonvolatile media in storage subsystem 680 that receives far memory write requests and generates transaction messages in accordance with any description herein.

System 600 includes processor 610 can include any type of microprocessor, central processing unit (CPU), graphics processing unit (GPU), processing core, or other processing hardware, or a combination, to provide processing or execution of instructions for system 600. Processor 610 can be a host processor device. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 600 includes interface 612 coupled to processor 610, which can represent a higher speed interface or a high throughput interface for system components that need higher bandwidth connections, such as memory subsystem 620 or graphics interface components 640. Interface 612 represents an interface circuit, which can be a standalone component or integrated onto a processor die. Interface 612 can be integrated as a circuit onto the processor die or integrated as a component on a system on a chip. Where present, graphics interface 640 interfaces to graphics components for providing a visual display to a user of system 600. Graphics interface 640 can be a standalone component or integrated onto the processor die or system on a chip. In one example, graphics interface 640 can drive a high definition (HD) display or ultra high definition (UHD) display that provides an output to a user. In one example, the display can include a touchscreen display. In one example, graphics interface 640 generates a display based on data stored in memory 630 or based on operations executed by processor 610 or both.

Memory subsystem 620 represents the main memory of system 600, and provides storage for code to be executed by processor 610, or data values to be used in executing a routine. Memory subsystem 620 can include one or more memory devices 630 such as read-only memory (ROM), flash memory, one or more varieties of random-access memory (RAM) such as DRAM, 3DXP (three-dimensional crosspoint), or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610, such as integrated onto the processor die or a system on a chip.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 600 includes interface 614, which can be coupled to interface 612. Interface 614 can be a lower speed interface than interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, 3DXP, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610, or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

Reference to nonvolatile media or nonvolatile memory devices that can act as a far memory in accordance with what is described herein can apply to different memory types. In one example, the nonvolatile memory device is a block addressable memory device, such as NAND or NOR flash technologies. Thus, a memory device can also include a future generation nonvolatile device, such as a three dimensional crosspoint memory device, other byte addressable nonvolatile memory devices. A memory device can include a nonvolatile, byte addressable media that stores data based on a resistive state of the memory cell, or a phase of the memory cell. In one example, the memory device can use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random-access memory (FeTRAM), magnetoresistive random-access memory (MRAM) memory that incorporates memristor technology, or spin transfer torque (STT)-MRAM, or a combination of any of the above, or other memory.

In general with respect to the descriptions herein, in one example a memory device includes: a nonvolatile memory (NVM) media having a media write unit as a smallest writeable unit of the NVM media, where the media write unit is different in size than a host write unit of a host controller to be coupled to the NVM device; and a media controller to receive write data for a write transaction from the host controller when coupled, and send a transaction message to indicate whether the write data for the write transaction was successfully committed to the NVM media.

In one example, the media write unit comprises a data slice and the host write unit comprises a data sector, wherein the data slice includes a multiple of data sectors. In one example, the media controller is to receive the write data and an associated commit indicator to indicate whether the write data is to be committed to the NVM media even if an amount of received write data does not equal a size of the media write unit. In one example, the media controller is to maintain write credits to indicate an available number of writes that can be pending to the NVM media. In one example, the media controller is to decrement the write credits in response to receive of the write transaction, and increment the write credits in response to successfully committing write data to the NVM media. In one example, each of the write credits is to indicate multiple write operations to the NVM media. In one example, the media controller is to receive a configuration command from the host controller to set a number of write credits and a number of media write units per write credit. In one example, the transaction message is to indicate errors per host write unit of the media write unit for the write data. In one example, he memory device further includes: a peripheral component interconnection express (PCIe) link controller to couple to the host controller over a PCIe link; wherein the media controller is to receive the write transaction and send the transaction message over the PCIe link. In one example, the transaction message comprises a vendor defined message (VDM). In one example, the transaction message comprises a transaction layer packet (TLP) of a transaction layer of the PCIe link. In one example, the write transaction is to indicate a last host write unit for the write transaction.

In general with respect to the descriptions herein, in one example a system includes: a host controller to write data in host write units as a smallest writeable unit for the host controller; and a nonvolatile memory (NVM) device, including a nonvolatile memory (NVM) media having a media write unit as a smallest writeable unit of the NVM media, where the media write unit is different in size than a host write unit of the host controller; and a media controller to receive write data for a write transaction from the host controller, and send a transaction message to indicate whether the write data for the write transaction was successfully committed to the NVM media.

In one example, the media controller is to maintain write credits to indicate an available number of writes that can be pending to the memory media. In one example, the transaction message is to indicate errors per host write unit of the media write unit for the write data. In one example, the NVM device further includes: a peripheral component interconnection express (PCIe) link controller to couple to the host controller over a PCIe link; wherein the media controller is to receive the write transaction and send the transaction message over the PCIe link. In one example, the write transaction is to indicate a last host write unit for the write transaction. In one example, the system further includes one or more of: a host processor device coupled to the host controller; a display communicatively coupled to a host processor; a network interface communicatively coupled to a host processor; or a battery to power the system.

In general with respect to the descriptions herein, in one example a method for writing data includes: receiving a write transaction at a media controller from a host controller, the write transaction including multiple host write units of write data, wherein the media controller is to commit data to a nonvolatile memory (NVM) media in media write units, wherein a single media write unit includes multiple host write units; committing the write data to the NVM media; and sending a transaction message to indicate whether the write data for the write transaction was successfully committed to the NVM media.

In one example, committing the write data to the NVM media comprises: updating write credits to indicate an available number of writes that can be pending to the NVM media. In one example, receiving the write transaction and sending the transaction message comprise: receiving the write transaction over a peripheral component interconnection express (PCIe) link; and sending the transaction message over the PCIe link.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device comprising:
a nonvolatile memory (NVM) media having a media write unit as a smallest writeable unit of the NVM media, where the media write unit is different in size than a host write unit of a host controller to be coupled to the memory device; and
a media controller to receive write data in a transaction layer message of a protocol for a write transaction from the host controller when coupled, and send an acknowledgement transaction layer message of the protocol to the host controller to indicate specific media write units of the write data for the write transaction successfully committed to the NVM media.

2. The memory device of claim 1, wherein the media write unit comprises a data slice and the host write unit comprises a data sector, wherein the data slice includes a multiple of data sectors.

3. The memory device of claim 1, wherein the media controller is to receive the write data and an associated commit indicator to indicate whether the write data is to be committed to the NVM media even if an amount of received write data does not equal a size of the media write unit.

4. The memory device of claim 1, wherein the media controller is to maintain write credits to indicate an available number of writes that can be pending to the NVM media.

5. The memory device of claim 4, wherein the media controller is to decrement the write credits in response to receive of the write transaction, and increment the write credits in response to successfully committing write data to the NVM media.

6. The memory device of claim 4, wherein each of the write credits is to indicate multiple write operations to the NVM media.

7. The memory device of claim 6, wherein the media controller is to receive a configuration command from the host controller to set a number of write credits and a number of media write units per write credit.

8. The memory device of claim 1, wherein the acknowledgement transaction layer message is to indicate errors per host write unit of the media write unit for the write data.

9. The memory device of claim 1, further comprising:
a peripheral component interconnection express (PCIe) link controller to couple to the host controller over a PCIe link, wherein the protocol comprises PCIe;
wherein the media controller is to receive the write transaction and send the acknowledgement transaction layer message over the PCIe link.

10. The memory device of claim 9, wherein the acknowledgement transaction layer message comprises a vendor defined message (VDM).

11. The memory device of claim 9, wherein the acknowledgement transaction layer message comprises a transaction layer packet (TLP) of a transaction layer of the PCIe link.

12. The memory device of claim 1, wherein the write transaction is to indicate a last host write unit for the write transaction.

13. A system, comprising:
a host controller to write data in host write units as a smallest writeable unit for the host controller; and
a nonvolatile memory (NVM) device, including
a nonvolatile memory (NVM) media having a media write unit as a smallest writeable unit of the NVM media, where the media write unit is different in size than a host write unit of the host controller; and
a media controller to receive write data in a transaction layer message of a protocol for a write transaction from the host controller when coupled, and send an acknowledgement transaction layer message of the protocol to the host controller to indicate specific media write units of the write data for the write transaction successfully committed to the NVM media.

14. The system of claim 13, wherein the media controller is to maintain write credits to indicate an available number of writes that can be pending to the NVM media.

15. The system of claim 13, wherein the acknowledgement transaction layer message is to indicate errors per host write unit of the media write unit for the write data.

16. The system of claim 13, the NVM device further comprising:
a peripheral component interconnection express (PCIe) link controller to couple to the host controller over a PCIe link, wherein the protocol is PCIe;
wherein the media controller is to receive the write transaction and send the acknowledgement transaction layer message over the PCIe link.

17. The system of claim 13, wherein the write transaction is to indicate a last host write unit for the write transaction.

18. The system of claim 13, further comprising one or more of:
a host processor device coupled to the host controller;
a display communicatively coupled to a host processor;

a network interface communicatively coupled to a host processor; or a battery to power the system.

19. A method for writing data, comprising:

receiving a write transaction at a media controller from a host controller, the write transaction including multiple host write units of write data, wherein the media controller is to commit data to a nonvolatile memory (NVM) media in media write units, wherein a single media write unit includes multiple host write units;

committing the write data to the NVM media; and sending an acknowledgement transaction layer message of a protocol to the host controller to indicate specific media write units of the write data for the write transaction successfully committed to the NVM media.

20. The method of claim 19, wherein committing the write data to the NVM media comprises:

updating write credits to indicate an available number of writes that can be pending to the NVM media.

21. The method of claim 19, wherein receiving the write transaction and sending the acknowledgement transaction layer message comprise:

receiving the write transaction over a peripheral component interconnection express (PCIe) link; and sending the acknowledgement transaction layer message over the PCIe link.

* * * * *